(12) United States Patent
Span et al.

(10) Patent No.: US 12,065,202 B2
(45) Date of Patent: Aug. 20, 2024

(54) ELECTROMECHANICAL RACK AND PINION STEERING SYSTEM FOR A MOTOR VEHICLE AND METHOD FOR PRODUCING SUCH A RACK AND PINION STEERING SYSTEM

(71) Applicant: ZF Automotive Germany GmbH, Alfdorf (DE)

(72) Inventors: Eduard Span, Cologne (DE); Frank Jaehde, Cologne (DE)

(73) Assignee: ZF Automotive Germany GMBH, Alfdorf (DE)

( * ) Notice: Subject to any disclaimer, the term of this patent is extended or adjusted under 35 U.S.C. 154(b) by 119 days.

(21) Appl. No.: 17/684,530

(22) Filed: Mar. 2, 2022

(65) Prior Publication Data

US 2022/0281514 A1 Sep. 8, 2022

(30) Foreign Application Priority Data

Mar. 2, 2021 (DE) .......................... 102021201985.4

(51) Int. Cl.
*B62D 5/04* (2006.01)
*B62D 3/12* (2006.01)

(52) U.S. Cl.
CPC ............. *B62D 5/0421* (2013.01); *B62D 3/12* (2013.01); *B62D 5/0442* (2013.01)

(58) Field of Classification Search
CPC ...... B62D 5/0421; B62D 3/12; B62D 5/0442; B62D 5/043; B62D 5/04
See application file for complete search history.

(56) References Cited

U.S. PATENT DOCUMENTS

2015/0266506 A1* 9/2015 Sato ..................... B62D 5/0409
180/444
2016/0084348 A1* 3/2016 Tabuchi ................. F16H 55/08
475/180

FOREIGN PATENT DOCUMENTS

DE 102016013272 A1 5/2018
EP 2314499 B1 12/2014

* cited by examiner

*Primary Examiner* — Zakaria Elahmadi
(74) *Attorney, Agent, or Firm* — Kristin L. Murphy

(57) ABSTRACT

The disclosure relates to an electromechanical rack and pinion steering system for a motor vehicle with an input shaft which is connected to a pinion shaft, wherein a torsion bar is arranged between the input shaft and the pinion shaft, and is directly connected to the input shaft, and the pinion shaft has a steering pinion section for interacting with a rack, and with an electric motor for driving the pinion shaft. The electric motor is connected to the pinion shaft by a transmission. An intermediate shaft piece is arranged between the pinion shaft and the input shaft. The intermediate shaft piece is connected directly to the pinion shaft and connected directly to the torsion bar.

11 Claims, 1 Drawing Sheet

ELECTROMECHANICAL RACK AND PINION STEERING SYSTEM FOR A MOTOR VEHICLE AND METHOD FOR PRODUCING SUCH A RACK AND PINION STEERING SYSTEM

CROSS-REFERENCE TO RELATED APPLICATION

This application claims priority to German Patent Application No. 102021201985.4, filed Mar. 2, 2021, the disclosure of which is incorporated herein by reference in its entirety.

TECHNICAL FIELD

The disclosure relates to an electromechanical rack and pinion steering system for a motor vehicle with an input shaft which is connected to a pinion shaft, wherein a torsion bar is arranged between the input shaft and the pinion shaft and is directly connected to the input shaft, and the pinion shaft has a steering pinion section for interacting with a rack, and with an electric motor for driving the pinion shaft, wherein the electric motor is connected to the pinion shaft by a transmission. The disclosure also relates to a method for producing such an electromechanical rack and pinion steering system.

BACKGROUND

Such an electromechanical rack and pinion steering system is known from DE 10 2016 013 272 A1. In this case the torsion bar is connected both directly to the input shaft and also directly to the pinion shaft.

It is disadvantageous if the components required in each case have to be adapted or changed for differently designed rack and pinion steering systems. This leads to undesirable expense. Instead, it is desirable to be able to use as many identical parts as possible for differently designed rack and pinion steering systems. The simplest possible assembly and/or calibration of components of the rack and pinion steering system should also be made possible in this case.

SUMMARY

What is needed, therefore, is an electromechanical rack and pinion steering system of the aforementioned type in such a way that the use of standardized components is facilitated. Assembly of components of the rack and pinion steering system and/or calibration is facilitated or improved. In particular, an alternative arrangement is to be provided.

An electromechanical rack and pinion steering system is disclosed herein, as well as a method for producing an electromechanical rack and pinion steering system.

The electromechanical rack and pinion steering system is designed for use in a motor vehicle. In this case the rack and pinion steering system has an input shaft that is connected to a pinion shaft. The input shaft can be designed as a steering shaft or can be connected to a steering shaft. A steering torque exerted by a driver on a steering wheel is preferably transmitted to the rack and pinion steering system via the input shaft, in particular using a steering shaft between the steering wheel and the input shaft. A torsion bar is arranged between the input shaft and the pinion shaft. This torsion bar is connected directly, and in one exemplary arrangement, non-rotatably, to the input shaft. In other words, the torsion bar is fastened to the input shaft. In particular, the torsion bar is part of a sensor device. This sensor device can be used to determine the steering torque required and applied to a steering wheel for open-loop and/or closed-loop control of the electric motor. The electric motor is designed to drive the pinion shaft, wherein the electric motor is connected to the pinion shaft by a transmission. The pinion shaft has a steering pinion section for cooperation with a rack. In particular, a rotation of the input shaft, and thus a rotation of the pinion shaft and of the steering pinion section, is converted into a linear movement of the rack via a toothed engagement of the steering pinion section with the rack. Tie rods, with the aid of which wheels of the motor vehicle can be adjusted for steering or guiding the motor vehicle, are arranged on the rack. Thus, a rotation of the steering wheel can be converted into a steering movement of the steered wheels. The electric motor interacts with the pinion shaft via the mechanical transmission and thus supports the driver in a steering maneuver.

In one exemplary arrangement, the transmission is designed as a worm gear and/or as a reduction gear. The transmission can have one gear or a plurality of gears. When the transmission is designed as a worm gear, it can have a worm shaft and a gear designed as a worm wheel. In particular, the electric motor is directly connected to the worm shaft, which in turn drives the worm wheel. In one exemplary arrangement, the pinion shaft is guided through an axle mount of the worm wheel, so that the worm wheel is connected to a gear fastening portion of the pinion shaft.

An intermediate shaft piece is arranged between the pinion shaft and the input shaft, wherein the intermediate shaft piece is connected directly to the pinion shaft and directly to the torsion bar.

In this case it is advantageous that, due to the intermediate shaft piece, the torsion bar is not directly connected to the pinion shaft. Instead, the intermediate shaft piece is directly connected to the pinion shaft, on the one hand, and directly to the torsion bar, on the other hand. In particular, the intermediate shaft piece serves as an adapter between the pinion shaft and the torsion bar and/or the input shaft, Such an intermediate shaft piece preferably enables the use of standardized components or identical parts, which can be used, for example, in differently designed rack and pinion steering systems. In one exemplary arrangement, the intermediate shaft piece compensates for different diameters, preferably external diameters and/or internal diameters, of components of the rack and pinion steering system. In one exemplary arrangement, the intermediate shaft piece is formed from metal. The intermediate shaft piece can be produced by a cold forging process and/or by a machining process. In one exemplary arrangement, the central longitudinal axes of the input shaft, the torsion bar and the pinion shaft coincide in a single central longitudinal axis.

According to a further development, the intermediate shaft piece has a first receptacle for connecting to the pinion shaft. In particular, the first receptacle is designed as a depression like a hollow cylinder or blind hole with a first internal diameter, An end portion of the pinion shaft is fastened in the first receptacle and/or pressed into the first receptacle. The end portion of the pinion shaft can have elevations and/or depressions, in particular a corrugation, on the circumferential surface thereof, whereby a particularly firm connection to the first receptacle of the intermediate shaft piece can be realized. The first receptacle can have further depressions and/or further elevations on an inner surface corresponding to the elevations and/or depressions on the end portion of the pinion shaft and to create a form fit between the pinion shaft and the first receptacle. The pinion shaft can have a plurality of portions with different external diameters. In this case the end portion of the pinion shaft can be designed as the portion of the pinion shaft with the smallest external diameter.

According to a further exemplary development, the intermediate shaft piece has a second receptacle for connecting to the torsion bar. In particular, the second receptacle is designed as a depression like a hollow cylinder or blind hole with a second internal diameter. Here, the first internal diameter of the first receptacle and the second internal diameter of the second receptacle are designed differently. An end portion of the torsion bar is preferably fastened in the second receptacle and/or pressed into the second receptacle. A further portion of the torsion bar facing away from the end portion of the torsion bar is directly connected to the input shaft. In particular, the torsion bar and the input shaft are fastened non-rotatably to one another. Thus, the input shaft is connected to the pinion shaft via an intermediate arrangement of the torsion bar and the intermediate shaft piece.

According to a further exemplary arrangement, the intermediate shaft piece has a further receptacle to receive one end of the input shaft. In one exemplary arrangement, the further receptacle is designed as a third receptacle of the intermediate shaft piece. The further receptacle can be designed as a depression like a hollow cylinder or blind hole with a further internal diameter. Here, the further internal diameter can differ from the first internal diameter of the first receptacle and the second internal diameter of the second receptacle. The end of the input shaft is arranged with a form fit in the further receptacle. Here, the end of the input shaft arranged in the further receptacle can block tilting of a central longitudinal axis of the input shaft relative to a central longitudinal axis of the intermediate shaft piece. In one exemplary arrangement, due to the form-fitting receptacle it is ensured that the central longitudinal axes of the input shaft and the intermediate shaft piece coincide. At the same time, a relative movement due to a rotation of the input shaft around its central longitudinal axis in relation to the intermediate shaft piece is not blocked or is possible in principle solely due to the form-fitting arrangement of the end of the input shaft in the further receptacle of the intermediate shaft piece. The fastening of the end of the input shaft to the intermediate shaft piece takes place, in particular exclusively, by the torsion bar.

According to a further exemplary arrangement, the first receptacle is connected to the further receptacle by the second receptacle. As a result, the intermediate shaft piece is designed as a hollow shaft with at least three internal diameters that differ from one another. In one exemplary arrangement, the first receptacle is arranged in the region of a first end of the intermediate shaft piece. The further receptacle is arranged in the region of a second end of the intermediate shaft piece facing away from the first end. The second receptacle is arranged in a central region of the intermediate shaft piece and between the first receptacle and the further receptacle. In one exemplary arrangement, the first internal diameter of the first receptacle is greater than the second internal diameter of the second receptacle. In one exemplary arrangement, the further internal diameter of the further receptacle is greater than the first internal diameter of the first receptacle. The intermediate shaft piece has a constant external diameter over its entire length in the direction of the central longitudinal axis.

The first receptacle, the second receptacle and the further receptacle can form a single common central longitudinal axis of the intermediate shaft piece. In one exemplary arrangement, the intermediate shaft piece is designed to be rotationally symmetrical to the central longitudinal axis.

According to a further exemplary arrangement, at least one sensor element of a sensor device is arranged on the intermediate shaft piece. In particular, the sensor element is fastened to an external circumference of the intermediate shaft piece or is pressed or injection-molded onto the external circumference of the intermediate shaft piece. In particular, the sensor device is designed as a torque detection device. In one exemplary arrangement, a further sensor element of the sensor device is arranged or fastened on the torsion bar or the input shaft. In this case it is advantageous that the intermediate shaft piece with the sensor element already mounted can already be calibrated in a separate step before the connection to the pinion shaft. This simplifies the calibration of the sensor element and/or the sensor device.

According to a further exemplary arrangement, an end face of the intermediate shaft piece facing away from the input shaft rests against a stop face of the pinion shaft that is oriented transversely or at right angles to the central longitudinal axis of the intermediate shaft piece. This results in a distinct end position, for example when the pinion shaft is mounted on the intermediate shaft piece. In one exemplary arrangement, at the same time the end face of the intermediate shaft piece facing away from the input shaft rests on an axle mount of a gear of the transmission. Here the gear can be designed as a worm wheel. Because the end face of the intermediate shaft piece rests simultaneously against the axle mount of the gear and the stop face of the pinion shaft, this results in a defined or predetermined positioning of the three components, the pinion shaft, shaft adapter and gear, relative to one another.

In one exemplary arrangement, the pinion shaft is mounted in a bearing such that it can rotate about its central longitudinal axis. Here, an axle mount of the gear of the transmission is arranged on a gear fastening portion of the pinion shaft between the bearing and the intermediate shaft piece. The gear can be pressed onto the gear fastening portion of the pinion shaft or can be injection molded on the gear fastening portion by a suitable injection molding process. In particular, the gear is formed from a plastics material. In one exemplary arrangement, the bearing is arranged between the gear of the transmission and the steering pinion section of the pinion shaft, and in one exemplary arrangement on a side of the gear facing away from the input shaft. The bearing can be designed as a ball bearing, for example. In this exemplary arrangement, the intermediate shaft piece and the steering pinion section of the pinion shaft are located in two portions facing away from one another in relation to the gear of the transmission.

In one exemplary method for producing the electromechanical rack and pinion steering system according to the disclosure, the intermediate shaft piece is arranged between the pinion shaft and the input shaft, and the intermediate shaft piece is connected directly to the pinion shaft and directly to the torsion bar.

Before the pinion shaft is connected to the intermediate shaft piece, the sensor element of the sensor device can be connected to the intermediate shaft piece. The sensor element mounted on the intermediate shaft piece can then be calibrated. The intermediate shaft piece can then be connected to the pinion shaft. The calibration of the sensor element and/or the sensor device is thus simplified, since this can be done before the rack and pinion steering system is fully assembled.

In particular, the rack and pinion steering system produced using the method according to the disclosure is an electromechanical rack and pinion steering system according to the disclosure as described above. The method is therefore further developed in accordance with the exemplary arrangement explained in connection with the electromechanical rack and pinion steering system according to the disclosure described here. Furthermore, the rack and pinion steering system described in this case can be further developed in accordance with the embodiments explained in connection with the method.

BRIEF DESCRIPTION OF DRAWINGS

The disclosure is explained in more detail below with reference to the drawings. In this case, the same reference signs relate to the same, similar, or functionally identical components or elements. In the drawings.

DETAILED DESCRIPTION

Figure 1:
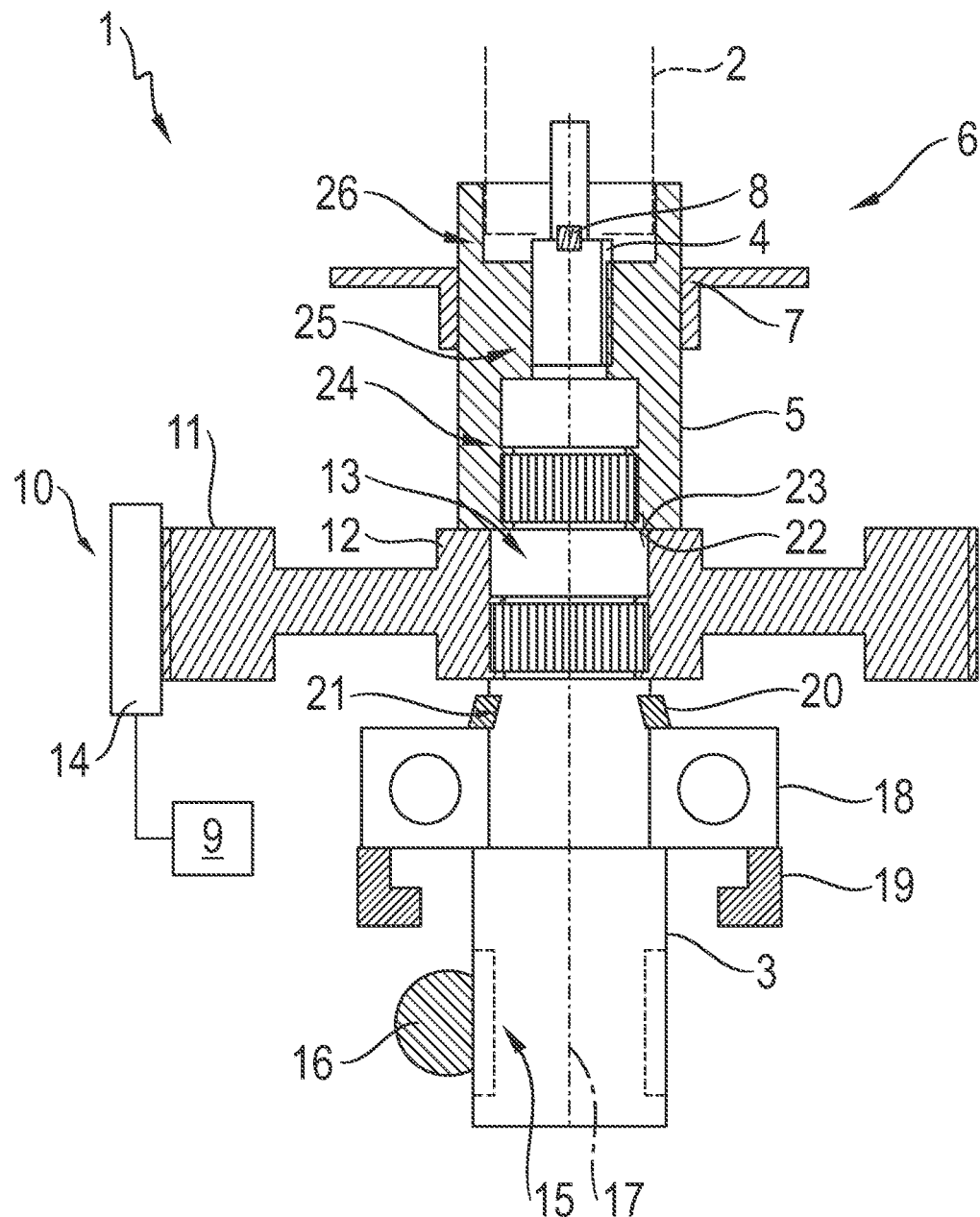
FIG. 1 shows a detail of a schematic, sectional top view of an electromechanical rack and pinion steering system according to an exemplary arrangement of the disclosure.

FIG. 1 shows a detail of a schematic, sectional top view of an electromechanical rack and pinion steering system 1 according to an exemplary arrangement of the disclosure. The rack and pinion steering system 1 is designed for use in a motor vehicle (not shown here). The rack and pinion steering system 1 has an input shaft 2 that is indicated here only partially and schematically by a dashed line. The rack and pinion steering system 1 also has a pinion shaft 3. The input shaft 2 and the pinion shaft 3 are connected to one another. For this purpose a torsion bar 4 is arranged between the input shaft 2 and the pinion shaft 3. The torsion bar 4 is directly connected to the input shaft 2. Furthermore, an intermediate shaft piece 5 is arranged between the pinion shaft 3 and the input shaft 2. Here, the intermediate shaft piece 5 is connected directly to the pinion shaft 3, on the one hand, and directly to the torsion bar 4, on the other hand.

The torsion bar 4 is also part of a sensor device 6. The sensor device 6 is designed as a torque detection device. The torsion bar 4 causes a relative rotation between the input shaft 2 and the intermediate shaft piece 5 depending on a steering torque. The sensor device 6 has a sensor element 7 which is arranged on the intermediate shaft piece 5. Here, the sensor element 7 is fastened to an external circumference of the intermediate shaft piece 5. With regard to an assembly of the rack and pinion steering system 1 and a calibration of the sensor element 7 or the sensor device 6, the intermediate shaft piece 5 with the sensor element 7 already mounted can already be calibrated in a separate step before the connection to the pinion shaft 3. This simplifies the calibration of the sensor element 7 or the sensor device 6.

In this exemplary arrangement, a further sensor element 8 of the sensor device 6 is arranged on the torsion bar 4, as is only indicated schematically. A steering torque required for open-loop and/or closed-loop control of an electric motor 9, which is only indicated schematically here, can be determined by the sensor device 6 and the torsion bar 4. This steering torque is applied by a steering wheel (not shown in more detail here), wherein the steering wheel is connected non-rotatably to the input shaft 2. In this case, at least one steering shaft or a plurality of steering shafts can be arranged between the input shaft 2 and the steering wheel, the steering shafts being in each case connected non-rotatably to one another or, on the one hand, to the input shaft 2 and, on the other hand, to the steering wheel.

The electric motor 9 is designed to drive the pinion shaft 3. For this purpose, the electric motor 9 is connected to the pinion shaft 3 by a transmission 10. In this exemplary arrangement, the transmission is designed as a worm gear. Furthermore, the transmission 10 is implemented as a reduction gear. The transmission 10 has a gear 11. That gear 11 has an axle mount 12. The pinion shaft 3 is guided through the axle mount 12, wherein a gear fastening portion 13 of the pinion shaft 3 is connected non-rotatably to the axle mount 12 of the gear 11. Furthermore, in this exemplary arrangement, the transmission 10 has a worm shaft 14, which is only indicated schematically here. The worm shaft 14 is driven by the electric motor 9, wherein the worm shaft 14 meshes with the gear 11 designed as a worm wheel, and thus the pinion shaft 3 is driven.

The pinion shaft 3 has a steering pinion section 15 for cooperation with a rack 16, Thus, the input shaft 2 serves to transmit the steering movement carried out on a steering wheel by a driver of a motor vehicle to the rack 16. Here, the rack and pinion steering system 1 converts a rotary movement of the input shaft 2 into a linear movement of the rack 16. In this way, wheels of the motor vehicle which are articulated on a tie rod (not shown here) can be steered. The rotary movement of the input shaft 2 and the pinion shaft 3 is converted into a translational or linear movement of the rack 16 by means of the steering pinion section 15 which meshes with the rack 16, Here; the electric motor 9 provides steering assistance by the transmission 10.

The pinion shaft 3 is supported so as to be rotatable about its central longitudinal axis 17 in a bearing 18. The bearing 18 can be designed, for example, as a ball bearing. In this exemplary arrangement, on a first side of the bearing 18, the bearing is supported in the axial direction of the central longitudinal axis 17 against a retaining element 19. In this exemplary arrangement, the retaining element 19 is designed as a retaining nut which is fastened in a suitable manner in a fixed position in relation to a steering gear housing (not shown in more detail here). On a second side of the bearing 18 facing away from the first side or from the retaining element 19, the bearing is secured in the axial direction of the central longitudinal axis by a retaining ring 20. In this case, the retaining ring 20 is arranged in a retaining groove 21 of the pinion shaft 3 designed to correspond to the retaining ring 20. The retaining groove 21 is introduced concentrically circumferentially around the central longitudinal axis 17 in the external circumference of the pinion shaft 3. The retaining ring 20, which is retained and fastened in the retaining groove 21, protrudes radially beyond the external circumference of the pinion shaft 3.

The bearing 18 is arranged between the gear 11 of the transmission 10 and the steering pinion section 15 of the pinion shaft 3. Furthermore, the axle mount 12 of the gear 11 is arranged on the gear fastening portion 13 of the pinion shaft 3 between the bearing 18 and the intermediate shaft piece 5. Starting from the steering pinion section 15 in the axial direction of the central longitudinal axis 17, the external circumference of the pinion shaft 3 decreases in several stages in the direction of the intermediate shaft piece 5, This facilitates the assembly of the rack and pinion steering system 1.

An end face 22 of the intermediate shaft piece 5 facing away from the input shaft 2 rests against a stop face 23 of the pinion shaft 3 that is oriented at right angles to the central longitudinal axis 17. Furthermore, at the same time the end face 22 of the intermediate shaft piece 5 facing away from the input shaft 2 rests against the axle mount 12 of the gear 11. This results in a predetermined positioning of the intermediate shaft piece 5, the pinion shaft 3 and the gear 11 in the axial direction of the central longitudinal axis 17.

The intermediate shaft piece 5 has a first receptacle 24 for connection to the pinion shaft 3. Here, the first receptacle 24 is designed as a depression like a hollow cylinder with a first internal diameter. An end portion of the pinion shaft 3 facing the input shaft 2 is fastened in the first receptacle 24 and is thereby connected non-rotatably to the intermediate shaft piece 5.

Furthermore, the intermediate shaft piece 5 has a second receptacle 25 for connection to the torsion bar 4. In this exemplary arrangement, the second receptacle 25 is also designed as a depression like a hollow cylinder. The second receptacle 25 has a second internal diameter that differs from the first internal diameter. In this exemplary arrangement, the first internal diameter of the first receptacle 24 is greater than the second internal diameter of the second receptacle 25. An end portion of the torsion bar 4 facing the pinion shaft 3 is fastened in the second receptacle 25. As a result, the torsion bar 5 is connected non-rotatably to the intermediate shaft piece 5.

In this exemplary arrangement, the intermediate shaft piece 5 has a further receptacle 26 to receive an end of the input shaft 2 facing the pinion shaft 3. The further receptacle 26 is designed as a depression like a hollow cylinder with a further internal diameter. In this exemplary arrangement, the further internal diameter of the further receptacle 26 is greater than the first internal diameter of the first receptacle 24. The end of the input shaft 2 facing the pinion shaft 3 is arranged in a form-fitting manner in the further receptacle 26. As a result, the end of the input shaft 2 arranged in the further receptacle 26 can be secured against tilting with respect to the central longitudinal axis 17. A relative turning of the input shaft 2 around the central longitudinal axis 17 and in relation to the intermediate shaft piece 5 is not prevented or blocked due to the end of the input shaft 2 being received in a form-fitting manner in the further receptacle 26. A non-rotatable connection is only implemented between the input shaft 2 and the torsion bar 4.

In this exemplary arrangement, the first receptacle 24 is connected to the further receptacle 26 by the second receptacle 25. As a result, the intermediate shaft piece 5 is designed as a hollow shaft with at least three internal diameters that differ from one another. The first receptacle 24, the second receptacle 25 and the further receptacle 26 form the single and common central longitudinal axis 17 of the intermediate shaft piece 5. In this exemplary arrangement, the intermediate shaft piece 5 is designed to be rotationally symmetrical to the central longitudinal axis 17. Furthermore, in this exemplary arrangement, the central longitudinal axes of the input shaft 2, the torsion bar 4 and the pinion shaft 3 coincide with the central longitudinal axis 17.

The invention claimed is:

1. An electromechanical rack and pinion steering system for a motor vehicle, comprising an input shaft connected to a pinion shaft, wherein a torsion bar is arranged between the input shaft and the pinion shaft and is directly connected to the input shaft, and the pinion shaft has a steering pinion section for interacting with a rack, and with an electric motor for driving the pinion shaft, wherein the electric motor is connected to the pinion shaft by a transmission, wherein an intermediate shaft piece is arranged between the pinion shaft and the input shaft, wherein the intermediate shaft piece is connected directly to the pinion shaft and directly to the torsion bar, wherein the intermediate shaft piece has a first receptacle for connecting to the pinion shaft and wherein the first receptacle is configured as a depression like a hollow cylinder or blind hole with a first internal diameter, and an end portion of the pinion shaft is fastened in the first receptacle and/or pressed into the first receptacle.

2. An electromechanical rack and pinion steering system for a motor vehicle, comprising:
an input shaft connected to a pinion shaft,
wherein a torsion bar is arranged between the input shaft and the pinion shaft and is directly connected to the input shaft, and
the pinion shaft has a steering pinion section for interacting with a rack, and with an electric motor for driving the pinion shaft,
wherein the electric motor is connected to the pinion shaft by a transmission,
wherein an intermediate shaft piece is arranged between the pinion shaft and the input shaft,
wherein the intermediate shaft piece is connected directly to the pinion shaft and directly to the torsion bar, the intermediate shaft piece having a first receptacle for connecting to the pinion shaft, a second receptacle for connecting to the torsion bar, and a further receptable for receiving one end of the input shaft,
wherein the first receptacle is connected to the further receptacle by the second receptacle, wherein the intermediate shaft piece is designed as a hollow shaft with at least three internal diameters which differ from one another, and in particular the first internal diameter is greater than the second internal diameter and/or the further internal diameter is greater than the first internal diameter.

3. The electromechanical rack and pinion steering system according to claim 2, wherein at least one sensor element of a sensor device is arranged on the intermediate shaft piece.

4. The electromechanical rack and pinion steering system according to claim 1, wherein an end face of the intermediate shaft piece facing away from the input shaft rests against a stop face of the pinion shaft that is oriented transversely or at right angles to the central longitudinal axis of the intermediate shaft piece.

5. The electromechanical rack and pinion steering system according to claim 1, wherein the pinion shaft is mounted in a bearing such that the pinion shaft can rotate about its central longitudinal axis, wherein an axle mount of a gear-of the transmission is arranged on a gear fastening portion of the pinion shaft between the bearing and the intermediate shaft piece, and wherein the bearing is arranged between the gear of the transmission and the steering pinion section of the pinion shaft.

6. The electromechanical rack and pinion steering system of claim 1, wherein the intermediate shaft further comprises a second receptacle for connecting to the torsion bar, wherein the second receptacle is designed as a depression like a hollow cylinder or blind hole with a second internal diameter, and an end portion of the torsion bar is fastened in the second receptacle and/or pressed into the second receptacle.

7. The electromechanical rack and pinion steering system of claim 6, wherein the intermediate shaft further comprises a further receptacle for receiving one end of the input shaft, wherein the further receptacle is designed as a depression like a hollow cylinder or blind hole with a further internal diameter, and wherein the end of the input shaft is arranged in a form-fitting manner in the further receptacle.

8. The electromechanical rack and pinion steering system according to claim 2, wherein the first receptacle, the second receptacle and the further receptacle form a single common central longitudinal axis of the intermediate shaft piece, and the intermediate shaft piece is designed to be rotationally symmetrical to the central longitudinal axis.

9. The electromechanical rack and pinion steering system according to claim 3, wherein the sensor element is fastened to an external circumference of the intermediate shaft piece or pressed onto an external circumference of the intermediate shaft piece.

10. The electromechanical rack and pinion steering system according to claim 4, wherein the end face of the intermediate shaft piece facing away from the input shaft rests at the same time against an axle mount of a gear of the transmission.

11. The electromechanical rack and pinion steering system according to claim 2, wherein the pinion shaft is mounted in a bearing such that the pinion shaft can rotate about its central longitudinal axis, wherein an axle mount of a gear of the transmission is arranged on a gear fastening portion of the pinion shaft between the bearing and the intermediate shaft piece, and wherein the bearing is arranged between the gear of the transmission and the steering pinion section of the pinion shaft.

* * * * *